United States Patent [19]

Reynolds et al.

[11] 3,801,151

[45] Apr. 2, 1974

[54] DOUBLE-ACTING LIFT CYLINDER WITH INTEGRAL VELOCITY FUSES

[75] Inventors: Roy Reynolds, Milwaukee; William T. Neill, Brookfield, both of Wis.

[73] Assignee: Applied Power Inc., Milwaukee, Wis.

[22] Filed: Aug. 30, 1972

[21] Appl. No.: 284,874

[52] U.S. Cl. ............... 296/28 C, 91/420, 180/89 A, 254/93 R
[51] Int. Cl. ........................................... B62d 27/06
[58] Field of Search ................ 180/89 A; 296/28 C; 254/93 R; 91/420

[56] References Cited
UNITED STATES PATENTS

| | | | |
|---|---|---|---|
| 2,472,547 | 10/1969 | London | 180/89 A X |
| 2,588,520 | 3/1952 | Halgren et al. | 91/420 |
| 2,306,348 | 12/1942 | Spear | 180/89 A |
| 3,228,658 | 1/1966 | London | 254/93 R |
| 3,074,384 | 1/1963 | Pilch | 91/420 |

Primary Examiner—Albert J. Makay
Assistant Examiner—Leslie J. Paperner
Attorney, Agent, or Firm—James E. Nilles

[57] ABSTRACT

A truck has a cab tiltable between full-down and full-tilt positions by means of double-acting hydraulic lift cylinders. The double-acting cylinder and the control system therefor, which includes a manually, electrically or air driven pump and a manually operable selector valve, enables the cab to be positively moved from full-down to overcenter position whereupon the cab then slowly descends under the force of gravity to full-tilt position. Furthermore, it enables the cab to be positively moved from full-tilt position to overcenter position whereupon the cab then slowly descends under the force of gravity to full-down position. Each cylinder is provided with two integrally mounted velocity fuses as a safety feature. In the event of a hydraulic system failure, one fuse prevents free-fall movement of the cab when the cab is in any position between full-down and overcenter position. In one embodiment of the invention, both fuses are located in the lower end of the cylinder. In another embodiment, the fuses are located at opposite ends of the cylinder.

9 Claims, 11 Drawing Figures

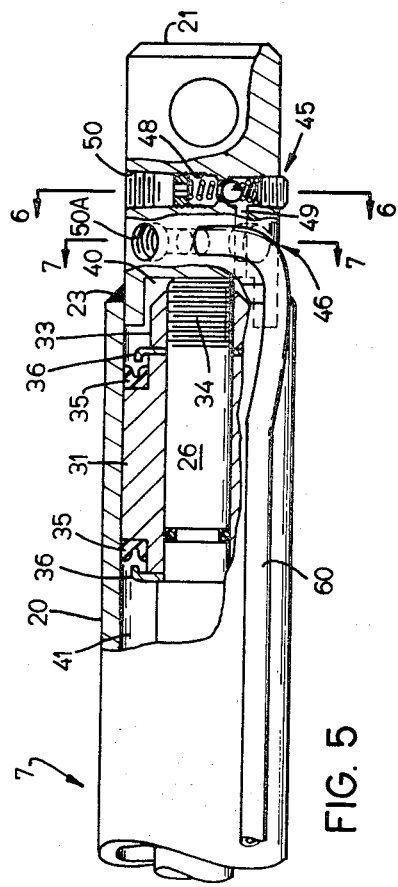
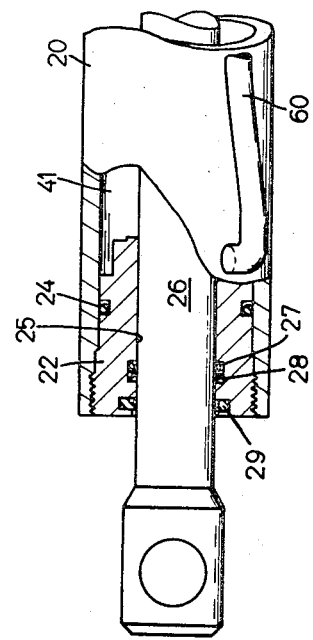
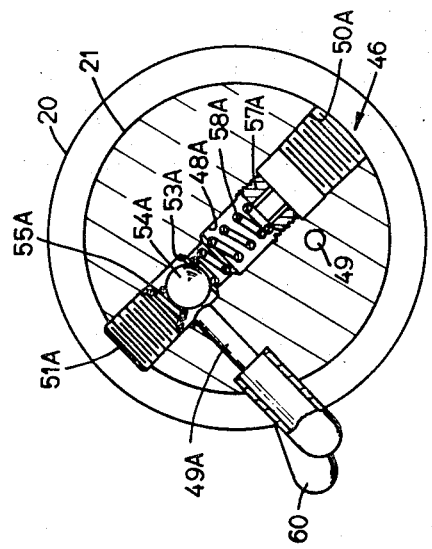
FIG. 5
FIG. 6
FIG. 7

PATENTED APR 2 1974 3,801,151

DOUBLE-ACTING LIFT CYLINDER WITH INTEGRAL VELOCITY FUSES

BACKGROUND OF THE INVENTION

1. Field of Use

This invention relates generally to hydraulic lift cylinders. In particular, it relates to double-acting lift cylinders with two integral velocity fuses provided therein for safety reasons.

2. Description of the Prior Art

In installations where a hydraulic lift cylinder is used to raise and lower a load, it is the practice to employ a velocity fuse to prevent uncontrolled free-fall of the load in the event that there is a failure such as a leak in the hydraulic fluid system which operates the cylinder. U.S. Pat. No. 3,228,658, issued Jan. 11, 1966 to A. G. London for a "Hydraulic Lift" and assigned to the same assignee as the present application, discloses a single-acting hydraulic lift cylinder with a single velocity fuse mounted integral with the lift cylinder. The system disclosed in that patent reduces the chance of an accident from a falling load caused by loss of system pressure when a load is elevated by the lift cylinder. In some instances a double-acting cylinder is employed to raise and lower a load. For example, in a truck which has a tiltable cab which is movable between full-down and full-tilt positions past an overcenter point, a double-acting cylinder connected between the truck chassis and the tiltable cab is used to tilt the cab. The double-acting cylinder and the control system therefor, which included a manually, electrically or air driven pump and a manually operable selector valve, enabled the cab to be positively moved from full-down to overcenter position whereupon the cab then slowly descended under the force of gravity to full-tilt position. Furthermore, it enabled the cab to be positively moved from full-tilt position to overcenter position whereupon the cab then slowly descended under the force of gravity to full-down position. In such an arrangement it is desirable to prevent accidental free-fall of the cab on either side of the overcenter position in the event of a hydraulic system failure. Heretofore, such accidental free-fall was prevented by the use of two velocity fuses, one for each end of the cylinder. However, in such prior art systems, each of the velocity fuses was structurally independent of the lift cylinder and was physically mounted in the hydraulic fluid line leading to the appropriate end of the cylinder. Such an arrangement exposed each of the velocity fuses and their associated hydraulic fluid lines to possible physical damage such as breakage of the fuses by flying stones thrown up from the highway, abrasion and wear. Therefore, even though fuses were provided as a safety feature, they themselves were unduly exposed to possible failure.

SUMMARY OF THE INVENTION

In accordance with the present invention there is provided a truck which has a cab tiltable between full-down and full-tilt positions through an overcenter point by means of a double-acting hydraulic cylinder having two integral velocity fuses mounted therein. A manually, electrically or air driven hydraulic fluid pump is provided to supply operating fluid to the hydraulic lift cylinder. A manually operable two position valve is connected between the pump and the lift cylinder to connect the pump either to the extend or retract side of the lift cylinder through the appropriate velocity fuses and to connect the other side of the cylinder and its velocity fuse to a fluid reservoir. In operation, fluid is supplied to the appropriate side of the lift cylinder to move the cab between full-down position and full-tilt position. The double-acting cylinder and the control system therefor, which includes the manually, electrically or air driven pump and the manually operable selector valve, enables the cab to be positively moved from full-down to overcenter position whereupon the cab then slowly descends under the force of gravity to full-tilt position. Furthermore, it enables the cab to be positively moved from full-tilt position to overcenter position whereupon the cab then slowly descends under the force of gravity to full-down position. The velocity fuse associated with the extend chamber prevents accidental free-fall of the cab back to full-down position in the event of a hydraulic control system failure while the cab is between full-down and overcenter positions. The velocity fuse associated with the retract chamber prevents uncontrolled free-fall of the cab to full-tilt position in the event of a hydraulic control system failure while the cab is between overcenter and full-tilt position.

The hydraulic lift cylinder comprises a hollow cylinder having its lower end closed by a base member and its upper end closed by a sealing gland. A piston rod with a piston mounted thereon is slidably mounted in the cylinder and extends through an opening in the sealing gland. The piston divides the hollow interior of the cylinder into an extend chamber located near the lower end of the cylinder and a retract chamber located near the upper end of the cylinder.

In accordance with one embodiment of the invention, the two velocity fuses are integrally formed in the base member of the cylinder. In this embodiment, the push port of one velocity fuse is connected by an internal passage in the base member to the extend chamber and the pull port of the other velocity fuse is connected by an external passage such as a tube to the retract chamber of the cylinder.

In accordance with another embodiment of the invention, one of the velocity fuses is located in the base member of the cylinder and has its push port connected by an internal passage in the base member to the extend chamber of the cylinder. The other velocity fuse is physically mounted in the sealing gland at the other end of the cylinder and an internal passage in the gland connects the pull port of the other velocity fuse to the retract chamber of the cylinder.

Double-acting hydraulic lift cylinders having integrally mounted velocity fuses in accordance with the present invention offer several advantages from the standpoint of safety. For example, since both of the velocity fuses are integrally formed with the lift cylinder, they are not exposed or subject to physical damage. Furthermore, the hose connections between the velocity fuses and the lift cylinder are eliminated. Also, the hydraulic fluid lines between the control valve and the velocity fuses on the lift cylinder can be substantially shortened. The construction and arrangement of the velocity fuses in the lift cylinder is such that efficient use is made of existing cylinder component parts and standard machining operations and fabrication techniques can be employed to provide the integral fuses because of the novel arrangement. Other objects and advantages of the invention will hereinafter appear.

DRAWINGS

FIG. 5 is an enlarged cross-sectional view of the lift cylinder shown in FIG. 1;

FIG. 6 is an enlarged cross-sectional view taken on line 6—6 of FIG. 5 and showing one of the velocity fuses for the cylinder;

FIG. 7 is an enlarged cross-sctional view taken on line 7—7 of FIG. 5 and showing the other velocity fuse for the cylinder;

DESCRIPTION OF THE PREFERRED EMBODIMENTS

Figure 1:
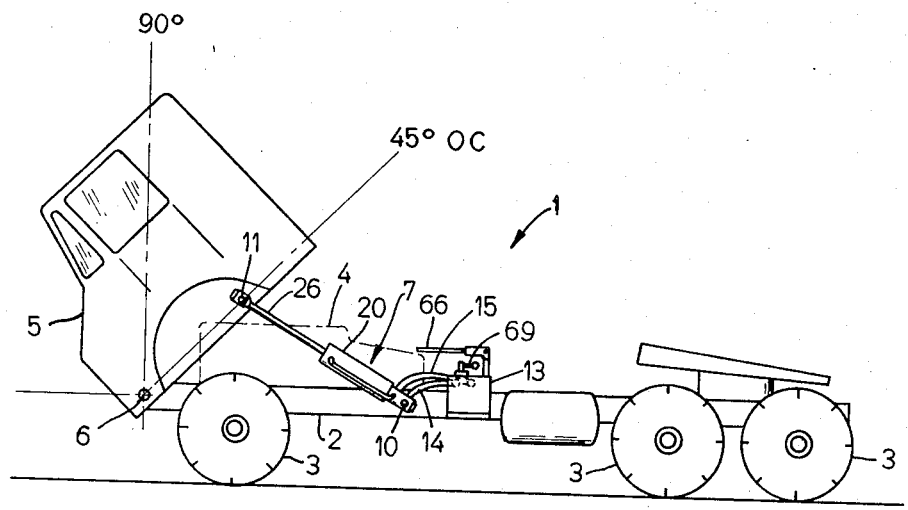
FIG. 1 is a side view of a truck having a tiltable cab with the cab shown tilted to an approximate 45° position by a double-acting hydraulic lift cylinder in accordance with one embodiment of the invention.
Figure 2:
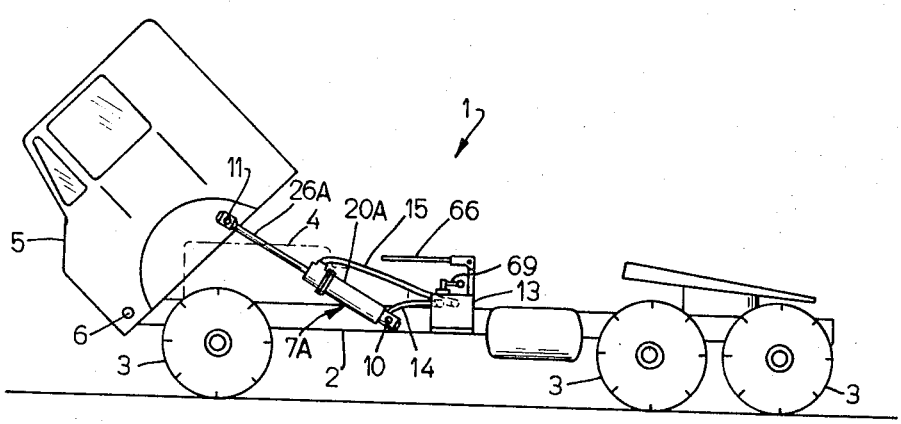
FIG. 2 is a view similar to FIG. 1 but showing a double-acting hydraulic lift cylinder in accordance with another embodiment of the invention.

Referring to FIGS. 1 and 2, there is shown a cab-over-engine type truck 1 comprising a chassis 2 which is provided with ground wheels 3 and an engine 4. Truck 1 also comprises a tiltable cab 5 which is pivotably mounted on chassis 2 over engine 4 by suitable pin means 6 and the cab is tiltable counterclockwise (with respect to FIGS. 1 and 2) to any position between it normal full-down position and a full-tilt position 90° from full-down position by means of a double-acting hydraulic lift cylinder in accordance with the invention. In FIG. 1 a lift cylinder in accordance with one embodiment of the invention is designated by the numeral 7. In FIG. 2, a lift cylinder in accordance with another embodiment of the invention is designated by the numeral 7A. Lift cylinders 7 and 7A comprise cylinders 20 and 20A and cylinder rods 26 and 26A, respectively. As FIGS. 1 and 2 show, the lower end of the cylinders 20 and 20A are pivotably connected by suitable pin means 10 to chassis 2. The piston rods 26 and 26A are pivotably connected by suitable pin means 11 to cab 5. Hydraulic fluid flow to and from lift cylinders 7 and 7A is controlled by a hydraulic fluid controller 13 hereinafter described in detail. In FIGS. 1 and 2, flexible hydraulic fluid hoses 14 and 15 are connected between the lift cylinders 7 and 7A and controller 13. As FIG. 1 shows, cab 5 is tiltable approximately 90° between full-down and full-tilt positions and the overcenter position is approximately 45° of cab tilt.

The first embodiment of the invention is disclosed in FIGS. 1, 3, 5, 6, 7 and 11. The second embodiment of the invention is disclosed in FIGS. 2, 4, 8, 9, 10 and 11.

First Embodiment

Referring to FIGS. 1, 3, 5, 6, 7 and 11, the first embodiment of the invention will now be described. As FIG. 5 shows, lift cylinder 7 comprises a hollow cylinder 20 which is closed at its lower end by a base member 21 and closed at its upper end by an externally threaded sealing gland 22 having an external O-ring 24. Base member 21 is secured to cylinder 20 as by welding 23. Sealing gland 22 is provided with a central opening 25 for cylinder rod 26 and an O-ring 27, a back-up ring 28, and a wiper 29 are provided in opening 25 around the piston rod to prevent oil leakage through opening 25. Piston rod 26 is provided at its lower end with a piston 31 which is secured against a shoulder 32 on rod 26 by plunger nut 33 which takes on to a threaded portion 34 of rod 26. Piston cups 35 are provided on opposite sides of piston 31 and piston cup retainers 36 are provided to maintain the cups in proper position. Piston 31 cooperates with the internal wall of cylinder 20 to define a piston rod extend chamber 40 and a piston rod retract chamber 41 on opposite sides of the piston.

Hydraulic lift cylinder 7 is provided with two integrally formed velocity fuses generally designated 45 and 46. Fuse 45 is shown in FIGS. 3, 5 and 6 and fuse 46 shown in FIGS. 3, 5 and 7.

Fuse 45 comprises a cross bore 48 which has a central axis generally perpendicular to the longitudinal axis of the cylinder. A passage 49 effects communication between cross bore 48 and extend chamber 40 of cylinder 20. Cross bore 48 is enlarged and threaded at one end and that end serves as a push-port 50. The other end of cross bore 48 is threaded and provided with a conventional sealing plug 51. Between port 50 and plug 51, cross bore 48 is formed with a reduced annular section 52. One side of section 52 forms a valve seat 53 for a valve ball 54. A guide spring 55 in the form of a cylindrically wound tapered compression spring is disposed between plug 51 and valve ball 54. Cross bore 48 on the other side of section 52 is provided with internal threads 56 which are adapted to engage the external threads on a hollow spring adjustment screw 57. An adjustment spring 58 is disposed between the inner surface of adjustment screw 57 and valve ball 54. Adjustment spring 58 is of sufficient length and strength to maintain valve ball 54 in spaced relationship from valve seat 53 under normal conditons of fluid flow. The fluid velocity necessary to seat ball 54 against valve 53 against the bias of spring 58 is adjustable by turning adjustment screw 57 to move it axially in cross bore 48 and thereby exerting greater or lesser pressure on adjustment spring 58. Ball 54 is adapted to move against valve seat 53 only in the event of a substantial loss of system pressure due to some type of system failure.

As FIGS. 5 and 7 show, fuse 46 is similar in construction and function to fuse 45. Thus, fuse 46 comprises a cross bore 48A which terminates in a pull-port 50A and is closed at one end by a sealing plug 51A. Fuse 46 also comprises a valve seat 53A, a valve ball 54A, a guide spring 55A, an adjustment spring 58A, and an adjustment screw 57A. Cross bore 48A of fuse 46 communicates with the retract chamber 41 of lift cylinder 7 by means of a passage 49A in base member 21 and by means of a hollow tube 60 which is connected between passage 49A and chamber 41. Tube 60 takes the form of a rigid tube or pipe, preferably metallic, which is located externally of cylinder 20.

Figure 3:
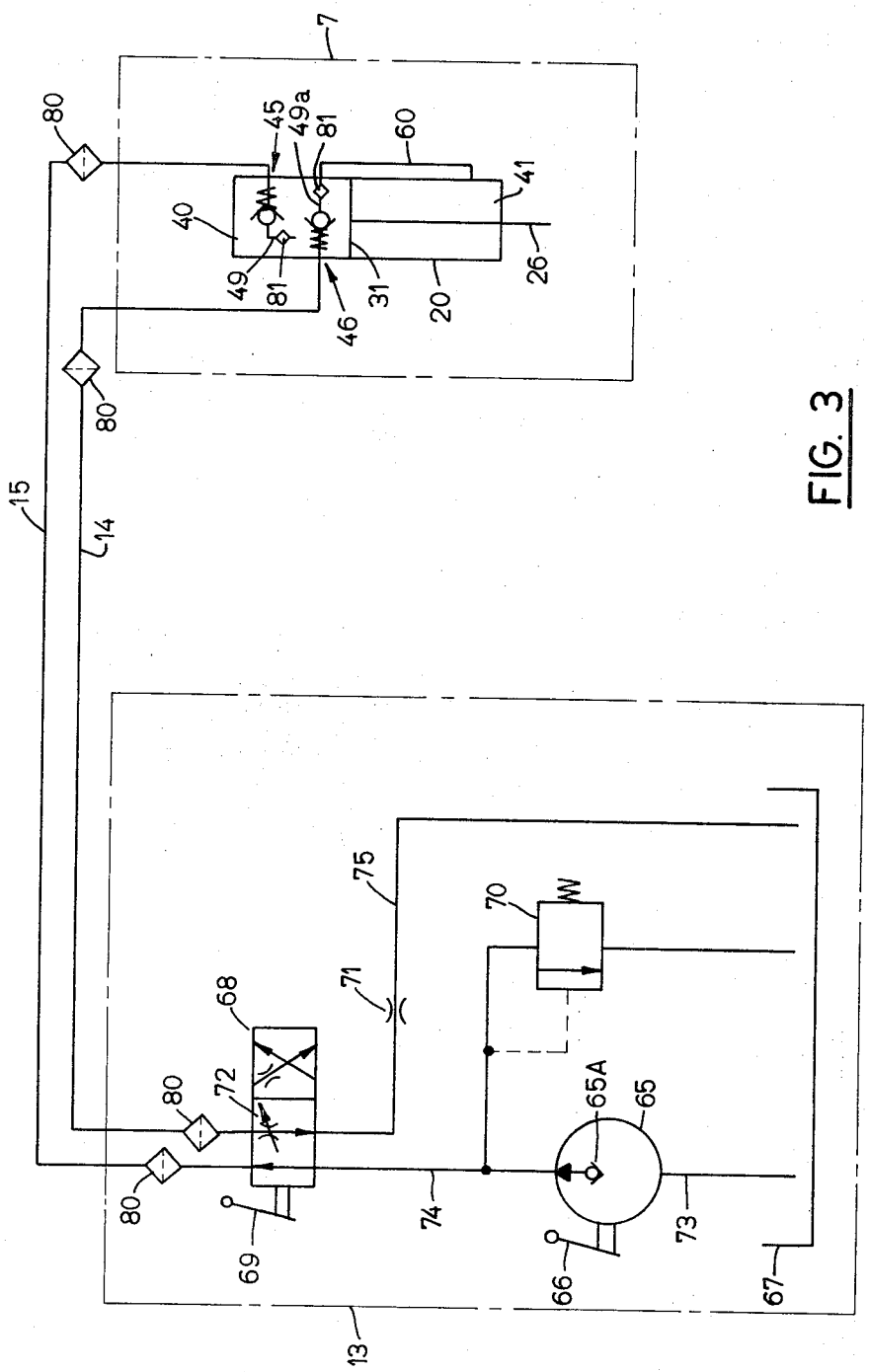
FIG. 3 is a schematic diagram of a hydraulic control circuit for the lift cylinder shown in FIG. 1.
Figure 11:
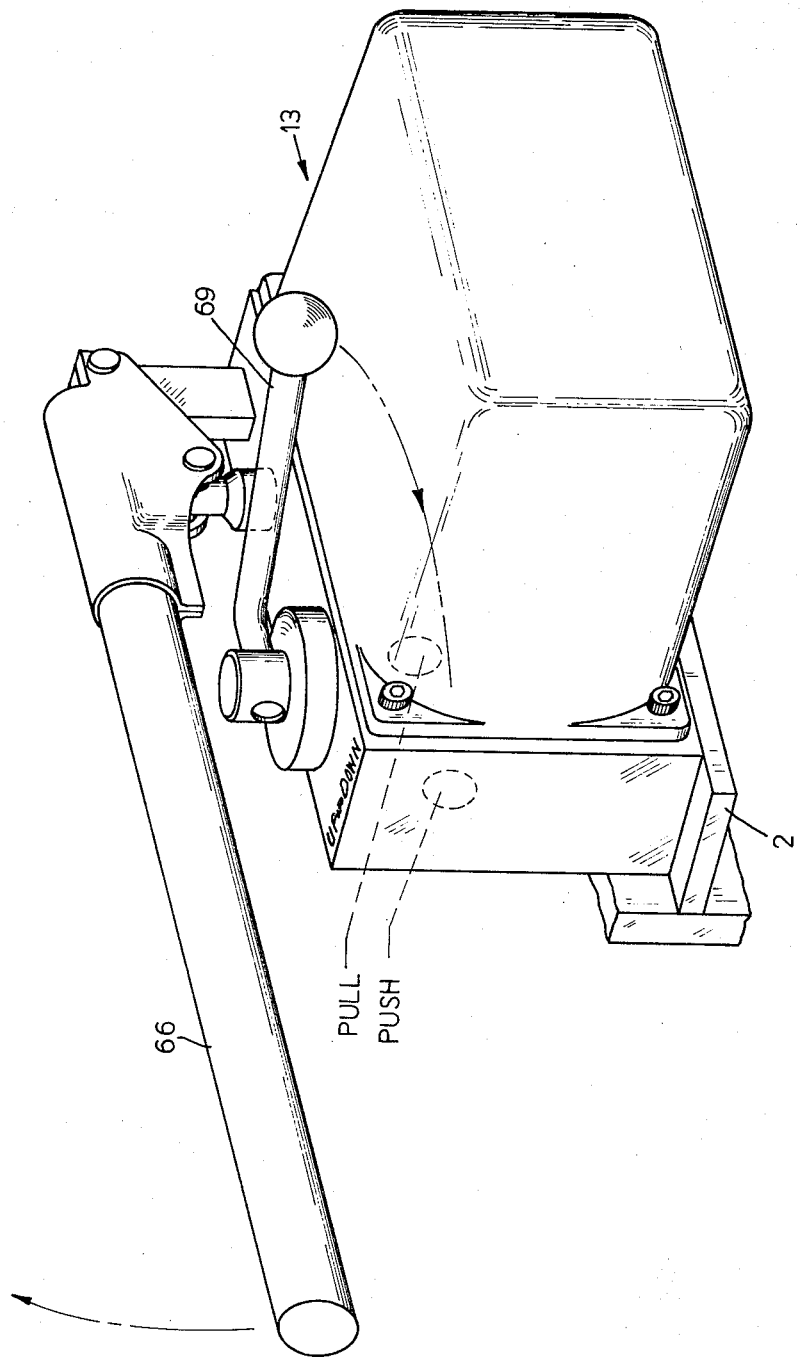
FIG. 11 is an isometric view of a hydraulic controller for operating lift cylinders in accordance with the invention.

Referring now to FIG. 3, there is shown the hydraulic control system for operating hydraulic lift cylinder 7. The controller 13 which is shown in FIGS. 1, 3 and 11 comprises a manually (or electrically or penumatically) operable hydraulic fluid pump 65 having a pump handle 66, a reservoir 67, a manually operable two position hydraulic control valve 68 having a manually operable handle 69, an overpressure relief valve 70, a fixed flow control orifice 71 and a variable fluid flow control orifice 72 located in valve 68 and variable by the degree of movement of valve handle 69. A conduit 74 connects pump 65 to valve 68 and conduit 73 connects the pump 65 to reservoir 67. A fluid return line 75 in which the flow control orifice 71 is located is connected between the valve 68 and reservoir 67. Pressure relief valve 70 is connected between line 74 and reservoir 67. The valve 68 is connected by fluid lines 14 and 15 to the fuses 46 and 45, respectively. When valve 68 is in the UP position shown in FIG. 3, pressurized fluid is supplied to the push-port of fuse 45 through line 15 and the pull-port of fuse 46 is connected through line 14 to fluid return line 75. When valve 68 is moved to its other position (DOWN), pressurized fluid is supplied through line 14 to fuse 46 and fuse 45 is connected through line 15 to fluid return line 74. Suitable filters 80 and 81 are provided at appropriate locations in the system. The filters 81 may be physically located inside the fuses, if desired. As FIG. 11 shows, it is preferred that pump 65, valve 58, relief valve 70, and reservoir 67, as well as all interconnecting fluid lines, be housed in a common sealed unit such as controller 13. Pump 65 is provided with an internal check-valve 65A at its outlet port which prevents fluid flow back through the pump when pumping action ceases. FIG. 11 shows that pump handle 66 is mounted for vertical pivotal movement on controller 13 and handle 69 of control valve 68 is mounted for horizontal pivotal movement on controller 13 and has UP and DOWN positions. Controller 13 is located on the chassis 2 of truck 1 so as to be readily accessible to the user.

The embodiment of the invention shown in FIGS. 1, 3, 5, 6, 7, and 11 operates as follows. Assume first that cab 5 is in its normal full-down position, that valve 68 is in the UP condition shown in FIG. 3, and that cylinder rod 26 of lift cylinder 7 is in fully-retracted position. To tilt the cab counterclockwise (with respect to FIG. 1) to full-tilt position, pump handle 66 is operated to pressurize fluid line 15 and to supply fluid through fuse 45 and passage 49 to expansion chamber 40 of lift cylinder 7. Fluid passes through cross bore 48, around valve ball 54, and through passage 49 into extend chamber 40. During the pumping operation, ball 54 will tend not to seat on valve seat 53 because of the action of adjustment spring 58. Pumping is continued until piston rod 26 raises or tilts cab 5 to overcenter position. When cab 5 passes overcenter postion, further pumping action of pump 65 is unnecessary because the cab will slowly descend under the force of gravity from overcenter position to full-tilt position. As this descent occurs, piston 31 is being moved by the weight of cab 5 and forces fluid from retract chamber 41, through tube 60, fuse 46, line 14, valve 68 and return line 75 to reservoir 67. The rate of gravity descent is controlled by moving handle 69 of valve 68 to adjust the size of fluid flow orifice 72 and thus control the rate of fluid flow therethrough. Fixed orifice 71 imposes a maximum limit on the rate of descent.

If pumping action is stopped while cab 5 is at any position between full-down and overcenter, the cab remains in locked position because check valve 65A in pump 65 prevents return fluid flow through the output port of pump 65.

When control valve 68 is in the UP condition shown in FIG. 3 and pump 65 is being operated to effect extension of piston rod 26, any fluid in retract chamber 41 of lift cylinder 7 is able to flow from chamber 41 through tube 60, through internal passage 49A, through fuse 46, through line 14, through valve 68, and through return line 75 to reservoir 67.

It is to be noted that with cab 5 tilted to some position between full-down and overcenter, any loss of pressure in the system caused by a failure of pump 65 or a rupture of a conduit, will result in operation of fuse 45 whereby ball valve 54 firmly seats against valve seat 53, thereby preventing return movement of piston rod 26. This occurs because a system failure causes a high velocity reverse flow of fluid from extend chamber 40 toward the reservoir 67. The differential pressures acting on ball 54 due to fluid flow velocity are sufficient to overcome the bias of adjustment spring 58 and, consequently, valve ball 54 will engage valve seat 53. The pressure exerted by the raised cab will maintain the ball tightened against the seat as long as the pressure in extend chamber 40 exceeds the pressure in line 15. This condition will prevail when cab 5 is positioned at some point between its full-down position and the overcenter position.

Similarly, with cab 5 tilted to some position between overcenter and full-tilt position, any loss of pressure in the system caused by a rupture of a conduit, will result in operation of fuse 46 whereby ball valve 54A firmly seats against valve seat 53A. When ball valve 54A seats, it stops the fluid flow from retract chamber 41 and stops the gravity descent of cab 5.

Once the cab 5 is in full-tilt position, it can be returned to full-down position by moving valve 68 to move it to DOWN position and by operating pump 65 to supply pressurized fluid to retract chamber 41 of cylinder 7 through line 14. Again, once the cab 5 reaches overcenter position, further pumping is unnecessary because the cab descends under the force of gravity from overcenter to full-down position. The appropriate fuse 45 or 46 is in readiness to prevent free fall of cab 5 in the event of a system failure, i.e., fuse 46 protects during movement from full-tilt to overcenter and fuse 45 protects during movement from overcenter to full-down position.

Second Embodiment

Figure 8:
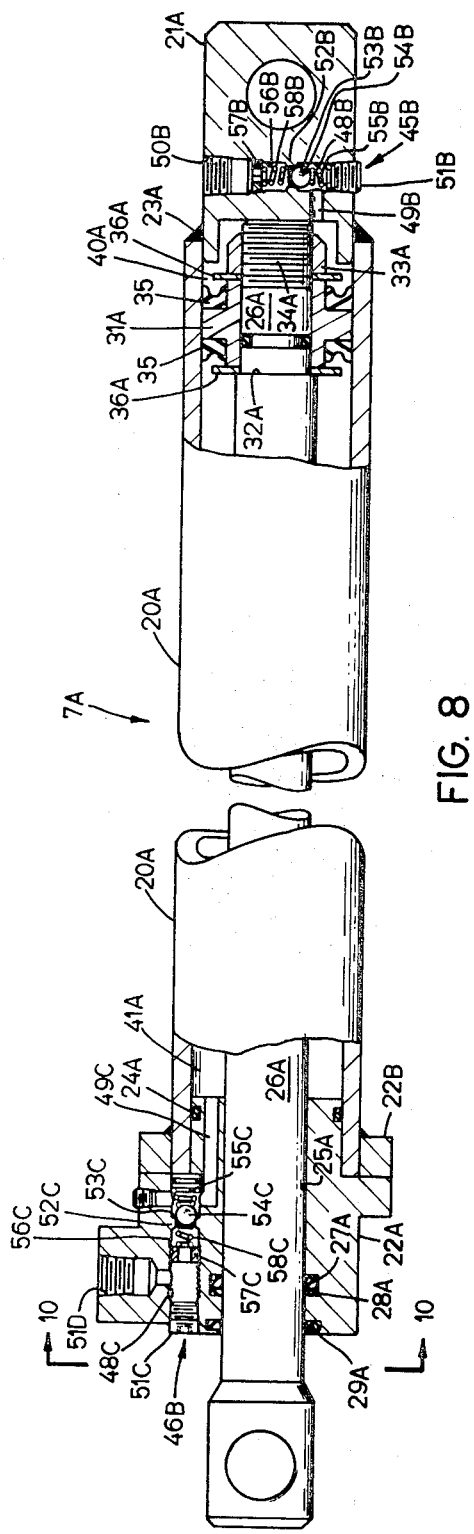
FIG. 8 is an enlarged cross-sectional view of the hydraulic lift cylinder shown in FIG. 2.

Referring to FIGS. 2, 4, 8, 9, 10 and 11, the second embodiment of the invention will now be described. As FIG. 8 shows, lift cylinder 7A comprises a hollow cylinder 20A which is closed at its lower end by a base member 21A and closed at its upper end by sealing gland 22A. Base member 21A is secured to cylinder 20A as by welding 23A. Sealing gland 22A is provided with an external O-ring 24A, with a central opening 25A for cylinder rod 26A and an O-ring 27A, a back-up ring 28A, and wiper 29A are provided in opening 25A around the piston rod 26A ro prevent oil leakage through opening 25A. Piston rod 26A is provided at its lower end with a piston 31A which is secured against a shoulder 32A on rod 26A by a plunger nut 33A which takes on to a threaded portion 34A of rod 26A. Piston cups 35A are provided on opposite sides of piston 31A and piston cup retainers 36A are provided to maintain the cups in proper position. Piston 31A cooperates with the internal wall of cylinder 20A to define a piston rod extend chamber 40A and a piston rod retract chamber 41A on opposite sides of the piston.

Figure 4:
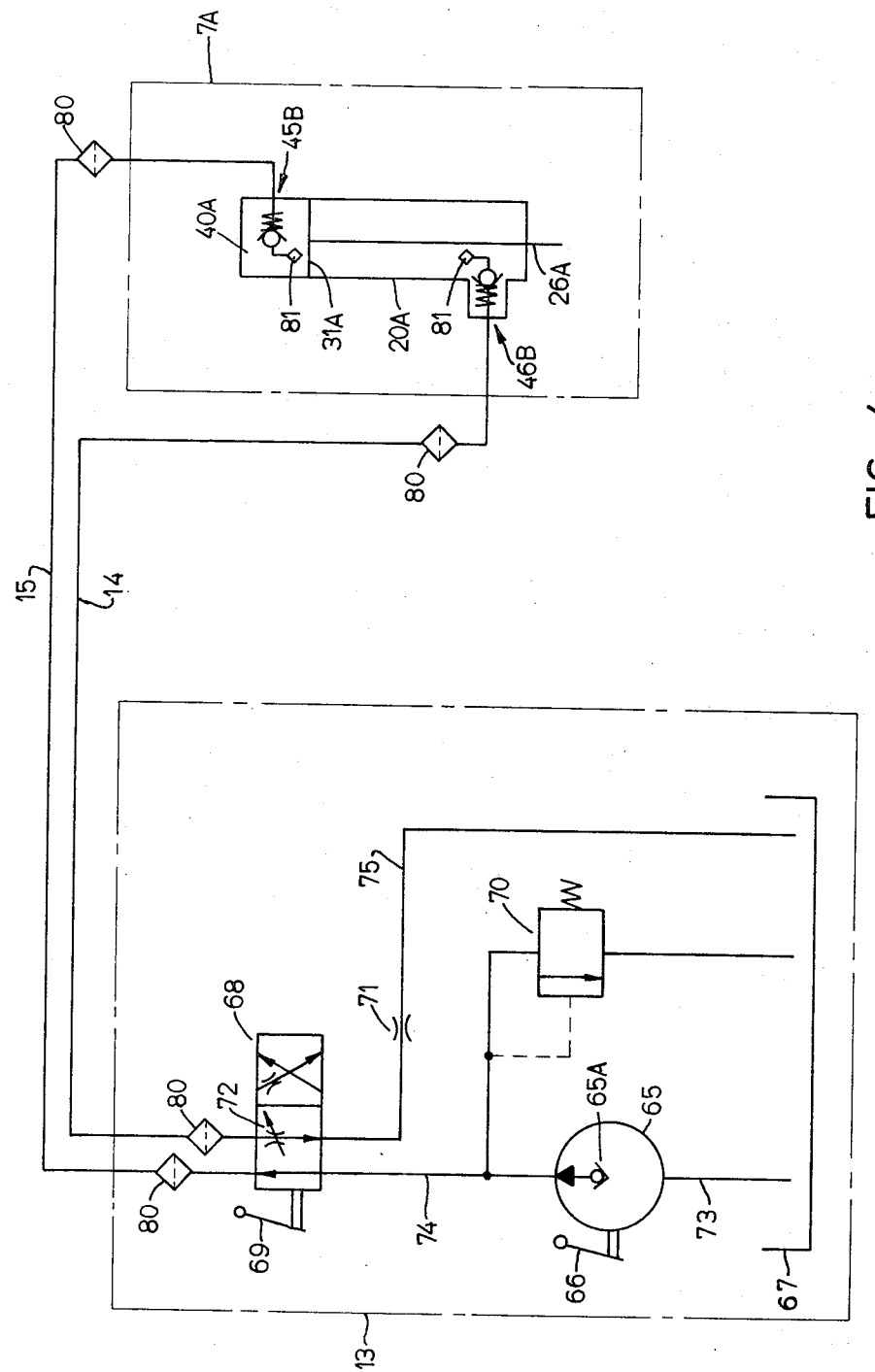
FIG. 4 is a schematic diagram of a hydraulic control for the lift cylinder shown in FIG. 2.

Hydraulic lift cylinder 7A is provided with two integrally formed velocity fuses generally designated 45B and 46B. Fuse 45B is shown in FIGS. 4 and 8 and fuse 46B is shown in FIGS. 4, 8 and 9.

Fuse 45B comprises a cross bore 48B which has a central axis generally perpendicular to the longitudinal axis of the cylinder. A passage 49B effects communication between cross bore 48B and extend chamber 40A of cylinder 20A. Cross bore 48B is enlarged and threaded at one end and that end serves as a push-port 50B. The other end of cross bore 48B is threaded and provided with a conventional sealing plug 51B. Between port 50B and plug 51B, cross bore 48B is formed with a reduced annualr section 52B. One side of section 52B forms a valve seat 53B for a valve ball 54B. A guide spring 55B in the form of a cylindrically wound tapered compression spring is disposed between plug 51B and valve ball 54B. Cross bore 48B on the other side of section 52B is provided with internal threads 56B which are adapted to engage the external threads on a hollow spring adjustment screw 57B. An adjustment spring 58B is disposed between the inner surface of adjustment screw 57B and valve ball 54B. Adjustment spring 58B is of sufficient length and strength to maintain valve ball 54B in spaced relationship from valve seat 53B under normal conditions of fluid flow. The fluid velocity necessary to seat ball 54B against valve 53B against the bias of spring 58B is adjustable by turning adjustment screw 57B to move it axially in cross bore 48B and thereby exerting greater or lesser pressure on adjustment spring 58B. Ball 54B is adapted to move against valve seat 53B only in the event of a substantial loss of system pressure due to some type of system failure.

Figure 9:
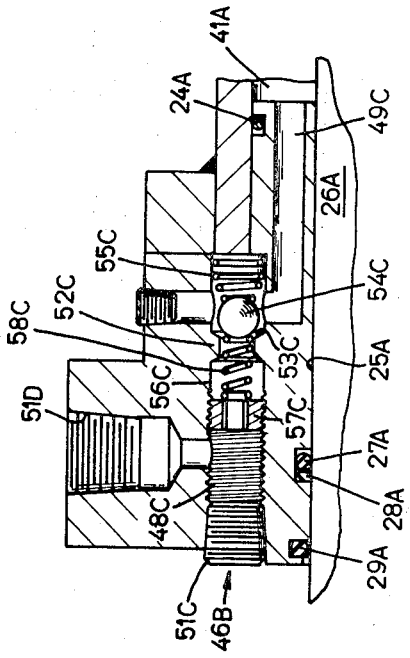
FIG. 9 is an enlarged cross-sectional view of one of the velocity fuses shown in FIG. 8.

As FIGS. 8 and 9 show, fuse 46B comprises a bore 48C which has a central axis generally parallel to the longitudinal axis of the cylinder 20A. A passage 49C effects communication between bore 48C and retract chamber 41A of cylinder 20A. Bore 48C is enlarged and threaded at one end and provided with a conventional sealing plug 51C. The other end of bore 48C is connected to passage 49C. A pull-port 51D connects to bore 48C. Between passage 49C and plug 51C, bore 48C is formed with a reduced annular section 52C. One side of section 52C forms a valve seat 53C for a valve ball 54C. A guide spring 55C in the form of a cylindrically wound tapered compression spring is disposed between the end wall of bore 48C and valve all 54C. Bore 48C on the other side of section 52C is provided with internal threads 56C which are adapted to engage the external threads on a hollow spring adjustment screw 57C. An adjustment spring 58 C is disposed between the inner surface of adjustment screw 57C and valve ball 54C. Adjustment spring 58 C is of sufficient length and strength to maintain valve ball 54 C in spaced relationship from valve seat 53C under normal conditions of fluid flow. The fluid velocity necessary to seat ball 54C against valve 53C against the bias of spring 58C is adjustable by turning adjustment screw 57C to move it axially in bore 48C and thereby exerting greater or lesser pressure on adjustment springs 58C. Ball 54C is adapted to move against valve seat 53 C only in the event of a substantial loss of system pressure due to some type of system failure.

Figure 10:
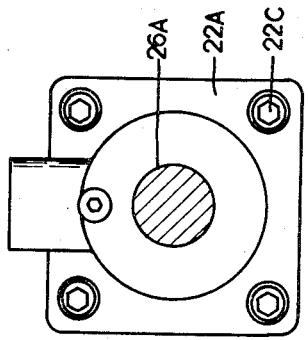
FIG. 10 is a view taken on line 10—10 of FIG. 8.

As FIG. 10 shows, gland 22A is secured to a flange 22B, welded to housing 20A, by bolts 22C.

Referring now to FIG. 4, there is shown the hydraulic control system for operating hydraulic lift cylinder 7A. The controller 13 which is shown in FIGS. 1, 4 and 11 is identical to that already described and comprises a manually operable hydraulic fluid pump 65 having a pump handle 66, a reservoir 67, a manually operable two position hydraulic control valve 68 having a manually operable handle 69, an overpressure relief valve 70, a fixed flow control orifice 71 and a variable fluid flow control orifice 72 located in valve 68 and variable by the degree of movement of valve handle 69. A conduit 74 connects pump 65 to valve 68 and a conduit 73 connects the pump 65 to reservoir 67. A fluid return line 75 in which the flow control orifice 71 is located is connected between the valve 68 and reservoir 67. Pressure relief valve 70 is connected between line 74 and reservoir 67. The valve 68 is connected by fluid lines 14 and 15 to the fuses 46B and 45B, respectively. When valve 68 is in the UP position shown in FIG. 4, pressurized fluid is supplied to the push-port of fuse 45B through line 15 and the pull-port of fuse 46B is connected through line 14 to fluid return line 75. When valve 68 is moved to its other position (DOWN), pressurized fluid is supplied through line 14 to fuse 46B and fuse 45B is connected through line 15 to fluid return line 75. Suitable filters 80 and 81 are provided at appropriate locations in the system. The filters 81 may be physically located inside the fuses, if desired. As FIG. 11 shows, it is preferred that pump 65, valve 68, relief valve 70, and reservoir 67, as well as all interconnecting fluid lines, be housed in a common sealed unit such as controller 13. Pump 65 is provided with an internal check-valve 65A at its outlet port which prevents fluid flow back through the pump when pumping action ceases. FIG. 11 shows that pump handle 66 is mounted for vertical pivotal movement on controller 13 and handle 69 of control valve 68 is mounted for horizontal pivotal movement on controller 13 and has UP and DOWN positions. Controller 13 is located on the chassis 2 of truck 1 so as to be readily accessible to the user.

The embodiment of the invention shown in FIGS. 2, 4, 8, 9, 10 and 11 operates as follows. Assume first that cab 5 is in its normal full-down position, that valve 68 is in the UP condition shown in FIG. 4, and that cylinder rod 26A of lift cylinder 7A is in fully-retracted position. To tilt the cab counterclockwise (with respect to FIG. 2) to full-tilt position, pump handle 66 is operated to pressurize fluid line 15 and to supply fluid through fuse 45B and passage 49B to expansion chamber 40A of lift cylinder 7A. Fluid passes through cross bore 48B, around valve ball 54B, and through passage 49B into extend chamber 40A. During the pumping operation, ball 54B will tend not to seat on valve seat 53B because of the action of adjustment spring 58B. Pumping is continued until piston rod 26A raises or tilts cab 5 to overcenter position. When cab 5 passes overcenter position, further pumping action of pump 65 is unnecessary because the cab will slowly descend under the force of gravity from overcenter position to full-tilt position. As this descent occurs, piston 31A is being moved by the weight of cab 5 and forces fluid from retract chamber 41A, through fuse 46B, line 14, valve 68 and return line 75 to reservoir 67. The rate of gravity descent is controlled by moving handle 69 of valve 68 to adjust the size of fluid flow orifice 72 and thus control the rate of fluid flow therethrough. Fixed orifice 71 imposes a maximum limit on the rate of descent.

If pumping action is stopped while cab 5 is at any position between full-down and overcenter, the cab remains in locked position because check valve 65A in pump 65 prevents return fluid flow through the output port of pump 65.

When control valve 68 is in the UP condition shown in FIG. 4 and pump 65 is being operated to effect extension of piston rod 26A, any fluid in retract chamber 41A of lift cylinder 7A is able to flow from chamber 41A through internal passage 49C through fuse 46B, through line 14, through valve 68, and through return line 75 to reservoir 67.

It is to be noted that with cab 5 tilted to some position between full-down and overcenter, any loss of pressure in the system caused by a failure of pump 65 or a rupture of a conduit, will result in operation of fuse 45B whereby ball valve 54B firmly seats against valve seat 58B, thereby preventing return movement of piston rod 26A. This occurs because a system failure causes a high velocity reverse flow of fluid from extend chamber 40A toward the reservoir 67. The differential pressure forces on ball 54B caused by the fluid flow velocity are sufficient to overcome the bias of adjustment spring 58B and, consequently, valve ball 54B will engage valve seat 53B. The pressure exerted by the raised cab will maintain the ball tightened against the seat as long as the pressure in extend chamber 40A exceeds the pressure in line 15. This condition will prevail when cab 5 is positioned at some point between its full-down position and the overcenter position.

Similarly, with cab 5 tilted to some position between overcenter and full-tilt position, any loss of pressure in the system caused by rupture of a conduit, will result in operation of fuse 46B whereby ball valve 54C firmly seats against valve seat 53C. When vall balve 54C seats, it stops the fluid flow from retract chamber 41A and stops the gravity descent of cab 5.

Once the cab 5 is in full-tilt position, it can be returned to full-down position by moving valve 68 to DOWN position and by operating pump 65 to supply pressured fluid to retract chamber 41A of cylinder 7A through line 14. Again, once the cab 5 reaches overcenter position, further pumping is unnecessary because the cab descends under the force of gravity from overcenter to full-down position. The appropriate fuse 45B or 46B is in readiness to prevent free fall of cab 5 in the event of a system failure, i.e., fuse 46B protects during movement from full-tilt to overcenter and fuse 45B protects during movement from overcenter to full-down position.

We claim:

1. In combination: a truck comprising a chassis and a cab mounted thereon for movement between a full-down position and a full-tilt position past an overcenter point;

a double-acting hydraulic jack connected between said chassis and cab for moving said cab and comprising a cylinder housing having a cylinder and a piston therein dividing said cylinder into an extend chamber and a retract chamber, said jack being operable in one direction to move said cab from full-down position past said overcenter point whereupon said cab tends to descend under the force of gravity toward full-tilt position and moves said piston further in said one direction, said jack being operable in a direction opposite to said one direction to move said cab from full-tilt position past said overcenter point whereupon said cab tends to descend under the force of gravity toward full-down position and moves said piston further in said opposite direction; a fluid reservoir; a selectively operable pump for receiving fluid from said reservoir and for supplying pressurized hydraulic fluid to operate said jack; a selectively operable control valve connected between said pump and said jack for directing fluid from said pump to either chamber of said jack to effect operation of said jack in either direction; check valve means connected to said pump to prevent back-flow of fluid from said jack through said pump when said pump is being operated to operate said jack in either direction; and first and second velocity fuses integrally mounted in said cylinder housing of said jack, each fuse being connected in a fluid passage between said control valve and one chamber of said jack, and comprising a movable valve member in said fluid passage, each valve member having an open position enabling fluid flow to and from its respective chamber when said cab is moving, and each valve member being responsive to a decrease of fluid pressure to prevent fluid flow from its respective chamber and thereby stop further descent of said cab under the force of gravity.

2. A combination according to claim 1 wherein both of said velocity fuses are located in passages at the same end of said cylinder housing.

3. A combination according to claim 2 wherein the passages for both velocity fuses are formed in said cylinder housing, and wherein one passage for one velocity fuses is connected by means of a rigid tube located exteriorly of said housing to one of said chambers.

4. A combination according to claim 1 wherein the passages for said velocity fuses are located in and near opposite ends of said cylinder housing.

5. A combination according to claim 1 wherein each velocity fuse comprises a bore having a reduced portion defining a valve seat on one side thereof, a ball valve in said bore for cooperation with said valve seat to prevent fluid flow through said bore in one direction, a fluid port connected to said bore on the other side of said reduced portion, adjustable spring means in said bore and engageable with said ball valve to maintain said ball valve unseated under normal conditions of fluid flow, guide spring means in said bore and engageable with said ball valve to maintain said ball valve in position to properly seat against said valve seat, and a passage connected between said bore on said one side of said reduced portion and one of said cylinder chamber.

6. A cylinder according to claim 5 wherein the pair of velocity fuses are located at the same end of said cylinder housing, wherein the passage for each fuse is formed in said cylinder housing, and wherein the passage for one fuse is connected by means of a tube located exteriorly of said cylinder housing to one of said chambers.

7. A cylinder according to claim 6 wherein the bores of said velocity fuses are transverse to the axis of said cylinder housing.

8. A cylinder according to claim 7 wherein the pair of velocity fuses are located at opposite ends of said cylinder housing and wherein the passages for connecting the bores thereof to said cylinder chamber are both formed in said cylinder housing.

9. A cylinder according to claim 8 wherein the bore of one velocity fuse is transverse to the axis of said cylinder housing and the bore of the other velocity fuse is parallel to the axis of said cylinder housing.

* * * * *